US012058307B2

(12) United States Patent
Trumbull

(10) Patent No.: US 12,058,307 B2
(45) Date of Patent: Aug. 6, 2024

(54) METHOD AND APPARATUS FOR PROJECTING 2D AND 3D MOTION PICTURES AT HIGH FRAME RATES

(71) Applicant: Magi International, LLC, Southfield, MA (US)

(72) Inventor: Douglas Trumbull, Southfield, MA (US)

(73) Assignee: Julia Trumbull, Southfield, MA (US)

( * ) Notice: Subject to any disclaimer, the term of this patent is extended or adjusted under 35 U.S.C. 154(b) by 0 days.

(21) Appl. No.: 17/385,199

(22) Filed: Jul. 26, 2021

(65) Prior Publication Data

US 2022/0191465 A1  Jun. 16, 2022

Related U.S. Application Data

(63) Continuation of application No. 16/573,137, filed on Sep. 17, 2019, now abandoned.

(60) Provisional application No. 62/732,307, filed on Sep. 17, 2018.

(51) Int. Cl.
*H04N 13/398* (2018.01)
*H04N 13/139* (2018.01)
*H04N 13/363* (2018.01)
*H04N 13/385* (2018.01)

(52) U.S. Cl.
CPC ......... *H04N 13/398* (2018.05); *H04N 13/139* (2018.05); *H04N 13/363* (2018.05); *H04N 13/385* (2018.05)

(58) Field of Classification Search
None
See application file for complete search history.

(56) References Cited

U.S. PATENT DOCUMENTS

| 3,687,530 A | 8/1972 | Watanuki |
| 3,695,751 A | 10/1972 | Watanuki |
| 4,022,522 A | 5/1977 | Rain |

(Continued)

FOREIGN PATENT DOCUMENTS

| WO | 2001006894 | 2/2001 |
| WO | 2011078883 | 6/2011 |
| WO | 2018009799 | 1/2018 |

OTHER PUBLICATIONS

International Preliminary Report on Patentability for PCT Application No. PCT/US2017/041102 mailed on Jan. 17, 2019, 12 pages.

(Continued)

*Primary Examiner* — Edemio Navas, Jr.
(74) *Attorney, Agent, or Firm* — Finch & Maloney PLLC

(57) ABSTRACT

High-frame-rate stereoscopic projection using a single digital projector provides a powerful sense of immersion when shown on wide screens, and the human eye perceives each frame as unique and separate from the others by virtue of the natural left-right "shuttering" that occurs via the chosen 3D projection technology. Techniques are provided for the introduction of one or more consecutive "digital dark frames" into the image streams presented to the dual projectors in such a manner that the sequence of out-of-phase photography is replicated via out-of-phase projection. This is achieved by alternately introducing the dark frames so that the sequence of stereoscopic images is presented in proper temporal continuity.

5 Claims, 4 Drawing Sheets

(56) References Cited

U.S. PATENT DOCUMENTS

| | | |
|---|---|---|
| 4,577,103 A | 3/1986 | Geary et al. |
| 4,656,506 A | 4/1987 | Ritchey |
| 5,175,575 A | 12/1992 | Gersuk |
| 5,376,980 A | 12/1994 | Gersuk et al. |
| 5,611,174 A | 3/1997 | Hayashi |
| 5,638,208 A | 6/1997 | Walker |
| 5,717,415 A | 2/1998 | Iue et al. |
| 5,724,775 A | 3/1998 | Zobel, Jr. et al. |
| 6,501,599 B1 | 12/2002 | Randolph et al. |
| 6,665,985 B1 | 12/2003 | Hennes |
| 6,793,350 B1 | 9/2004 | Raskar et al. |
| 6,874,889 B1 | 4/2005 | Hill |
| 7,106,411 B2 | 9/2006 | Read et al. |
| 7,295,244 B2 | 11/2007 | Manico et al. |
| 7,573,475 B2 | 8/2009 | Sullivan et al. |
| 8,259,162 B2 | 9/2012 | Kim et al. |
| 8,358,332 B2 | 1/2013 | Hendrickson et al. |
| 8,421,991 B2 | 4/2013 | Read et al. |
| 8,955,258 B2 | 2/2015 | Jacques et al. |
| 9,204,132 B2 | 12/2015 | Trumbull |
| 9,371,179 B2 | 6/2016 | Miller et al. |
| 9,848,182 B2 | 12/2017 | Trumbull |
| 2002/0009137 A1 | 1/2002 | Nelson et al. |
| 2002/0196538 A1 | 12/2002 | Lantz et al. |
| 2003/0038925 A1 | 2/2003 | Choi |
| 2003/0184674 A1 | 10/2003 | Manico et al. |
| 2004/0080822 A1 | 4/2004 | Shafer |
| 2005/0014567 A1 | 1/2005 | Li et al. |
| 2005/0036645 A1 | 2/2005 | Carver |
| 2005/0248726 A1 | 11/2005 | Read et al. |
| 2006/0150530 A1 | 7/2006 | Davey |
| 2006/0232582 A1 | 10/2006 | Fannon |
| 2007/0146478 A1 | 6/2007 | Masayoshi |
| 2007/0279415 A1 | 12/2007 | Sullivan et al. |
| 2009/0160934 A1 | 6/2009 | Hendrickson et al. |
| 2009/0195640 A1 | 8/2009 | Kim et al. |
| 2010/0300006 A1 | 12/2010 | Magpuri |
| 2011/0116048 A1 | 5/2011 | Read et al. |
| 2011/0279781 A1 | 11/2011 | Wei et al. |
| 2012/0247030 A1 | 10/2012 | Magpuri |
| 2012/0268570 A1 | 10/2012 | Trumbull |
| 2013/0167452 A1 | 7/2013 | Jacques et al. |
| 2014/0197168 A1 | 7/2014 | Miller et al. |
| 2014/0230340 A1 | 8/2014 | Fox |
| 2014/0232613 A1 | 8/2014 | Fox et al. |
| 2014/0235362 A1 | 8/2014 | Fox et al. |
| 2015/0146172 A1 | 5/2015 | Maillard et al. |
| 2016/0088289 A1* | 3/2016 | Trumbull .............. H04N 13/239 348/47 |
| 2016/0227199 A1* | 8/2016 | Gocke .................. H04N 9/3147 |
| 2016/0333597 A1 | 11/2016 | De Lespinois et al. |
| 2018/0368797 A1* | 12/2018 | Kuwata ................ A61B 6/5217 |
| 2019/0235623 A1 | 8/2019 | Pollard et al. |
| 2019/0277017 A1 | 9/2019 | Trumbull |

OTHER PUBLICATIONS

International Preliminary Report on Patententability, received in PCT Application No. PCT/US2010/003251, dated Jun. 26, 2012, 6 pages.

International Search Report and Written Opinion of the International Searching Authority dated Nov. 29, 2019 for International Patent Application No. PCT/US19/51434, 13 pages.

International Search Report and Written Opinion Received for PCT Application PCT/US2017/041102. Mail date: Sep. 14, 2017. 24 pages.

International Search Report, received in PCT Application No. PCT/US2010/003251, dated Apr. 18, 2011, 3 pages.

Luczak et al., "Spatio-Temporal Scalability Using Modified MPEG-2 Predictive Video Coding", X European Signal Processing Conference, Eusipco 2000 CD-ROM Proceedings, vol. II, 16:30, Tampere, Finland, Sep. 4-8, 2000, 4 pages.

McAllister, Display Technology: Stereo & 3D Display Technologies, Department of Computer Science, North Carolina State University, published Jan. 15, 2002, 50 pages.

Trumbull Studios, "The Magi Process", WISTIA video, https://trumbull.wistia.com/medias/wque2mkk41, https://trumbull.wistia.com/login?redirect_to=https%3A%2F%2Ftrumbull.wistia.com%2Fprojects, Jan. 2015.

* cited by examiner

METHOD AND APPARATUS FOR PROJECTING 2D AND 3D MOTION PICTURES AT HIGH FRAME RATES

CROSS-REFERENCE TO RELATED APPLICATIONS

This application is a continuation of U.S. patent application Ser. No. 16/573,137, filed on Sep. 17, 2019, and entitled "METHOD AND APPARATUS FOR PROJECTING 2D AND 3D MOTION PICTURES AT HIGH FRAME RATES," which claims the benefit of U.S. Provisional Application Ser. No. 62/732,307, filed on Sep. 17, 2018, each of which is hereby incorporated by reference in its entirety.

The following are incorporated herein by reference in their entireties.

- U.S. Pat. No. 9,204,132, issued Dec. 1, 2015, and entitled "METHOD AND APPARATUS FOR PHOTOGRAPHING AND PROJECTING MOVING IMAGES IN THREE DIMENSIONS"
- U.S. Pat. No. 9,848,182, issued Dec. 19, 2017, and entitled "METHOD AND APPARATUS FOR PHOTOGRAPHING AND PROJECTING MOVING IMAGES IN THREE DIMENSIONS"
- U.S. patent application Ser. No. 15/812,173, filed Nov. 14, 2017, and entitled "METHOD AND APPARATUS FOR PHOTOGRAPHING AND PROJECTING MOVING IMAGES IN THREE DIMENSIONS"

TECHNICAL FIELD

Embodiments of the present disclosure relate to photographing and projecting motion pictures at high frame rates in two dimension (2D) or three dimension (3D) in a manner that preserves the so-called "Film Look" of conventional cinema, as opposed to the so-called "Video Look" or "Soap Opera Effect" that can result from high frame rate photography and projection that approaches, meets, or exceeds conventional 24 frames per second (fps) industry standards.

BACKGROUND

Motion picture photography and projection is commonly accomplished via a series of still photographs on a strip of sprocketed celluloid film. In the camera, conventions of the motion picture industry call for a standardized frame rate of 24 frames per second, most commonly photographed using a rotating shutter in the camera such that during 360 degrees of shutter rotation, half of the time ($1/48^{th}$ of a second) the shutter is open while the film is held fixed in the camera aperture, and the other half of the time the shutter is closed in order for a mechanical movement to transport the film to the next frame, utilizing the perforations on the film to register to either sprockets or claws to move the film as well as hold it in position during each exposure.

For projection, the same frame rate of 24 is used, however the shutter speed is doubled, so that each frame of film is shown twice before proceeding to the next frame. The shutter is often called a "butterfly", having two openings of 90 degrees each, and two closures of 90 degrees each, thus still rotating at 360 degrees per frame. During one of the shutter closures the film is advanced to the next frame using a mechanical Geneva mechanism, or sometimes a low inertia electric stepper motor. The reason for the double shuttering, which creates a 48 cycle-per-second rate, is to reduce objectionable perceived flicker of the image on the screen, which is limited in brightness to not more than 16 foot lamberts. Projection brighter than 16 foot lamberts reintroduces objectionable perceived flicker.

An objectionable artifact of this double-shuttering of each image frame is a substantial loss of motion continuity due to the fact that the image does not contain new motion position on each flash, resulting in a stroboscopic effect retained in the human retina. This loss of motion continuity is exacerbated in stereoscopic motion pictures, since frame-to-frame image displacement is often equal to, or more than, the left eye—right eye image separation needed for stereoscopic imagery.

With the advent of digital photography and digital projection, however, it is now possible to consider an alternative methodology of photographing and projecting a series of images in such a manner as to fully retain both temporal motion continuity, while also diminishing the objectionable artifacts of the 24 fps world standard.

It is common knowledge amongst cinematographers, directors, and editors that frame-to-frame object or image motion must be substantially limited in order to avoid objectionable blurring or strobing. Blurring results from object/image motion that occurs during the shutter opening of $1/48^{th}$ of a second. Strobing occurs when the image displacement from one frame to the next becomes so great that the eye cannot integrate the sequence of frames into a smooth motion. Screen size is considered a limitation, since frame-to-frame image displacement can become quite objectionable on large screens due to angular displacement of frames on fast action. IMAX is a good example of this phenomenon, and IMAX films routinely slow their camera and object motion in order to avoid objectionable blurring and strobing.

Another shortcoming of the 24 frame standard is that when projecting a 3D movie, which includes two simultaneous projections of left and right eye imagery, if the motion displacement or blur between frames exceeds the displacement between right and left eye convergence angles, the 3D effect is lost and is overcome by blurring and strobing of the image.

An earlier invention and patent for the Showscan system disclosed the photographing and projecting of motion pictures at sixty frames per second. See U.S. Pat. No. 4,477,160, incorporated herein by reference in its entirety. The Showscan system resulted in a solution for the above shortcomings of conventional film, while demonstrably increasing a sense of "liveness" and audience stimulation. Each frame was shown only once, thus not using a double-bladed shutter, and at a shutter opening of $120^{th}$ of a second, blurring of the recorded image was substantially reduced. At a projection rate of 60 frames per second, there was no apparent flicker at any increased screen brightness, and there was no discontinuity of motion. 3D films photographed and projected in Showscan had no objectionable object/image motion limitations that would adversely affect the 3D illusion.

Nevertheless, worldwide motion picture audiences are accustomed to the 24 frames per second standard, although the advent of 3D production and exhibition is revealing the shortcomings of the 24 fps standard, and since the film is attempting to create a more "immersive" experience for the viewer, it is now possible to consider a high frame rate solution that solves problems in both photography and projection. Accordingly, embodiments of the present disclosure are intended to take advantage of emerging digital technologies of electronic cinematography and digital projection, which no longer requires adherence to the world standard of 24 fps. In fact, the entire idea of "frames" as individual still photographs projected in rapid succession can now be revised to a new concept of overall fluid image flow by substantially increasing the number of frames per second. Since the photographed standard 24 fps film must be projected at a higher flash rate in order to avoid perceived flicker, and also solve the requirements for polarized stereoscopic projection, it is common to interleave alternating left and right eye frames via several alternating flashes.

For example, the ReaID digital polarization technique alternately polarizes left and right eye images by sequentially flashing each frame as much as three times, resulting in a "flash rate" of 144 flashes (each frame being "shown" onto the screen three times). In this way a 24 fps film can be projected by a single digital projector. Since a new objective of "immersive stereoscopic imagery" is emerging, it is now possible to consider that each of the 144 flashes could actually be new frames of motion information, photographed at 144 frames per second. One of the major shortcomings of the present standards used when projecting 24 fps stereoscopic films is that the temporal information rate is unable to satisfy the need to reduce or eliminate blurring and strobing of the image that is quite objectionable when viewing the film stereoscopically. The advent of this invention is that by alternately photographing 72 left eye images interleaved with 72 right eye images, there remains perfect temporal continuity of the imagery.

In fact, filmmakers often desire to include in their films as much action as possible in order to instill a sense of participation and excitement in viewers, resulting in a sense of sensory immersion. Yet, a tremendous amount of this action is lost in blur if the frame rate is limited to 24 fps. And in 3D, at 24 fps the image may lose all sense of stereoscopic dimension due to both blur and strobing.

In view of the above, there is a need for a digital cinematographic and projection process that provides 3D stereoscopic imagery that is not adversely affected by the standard frame rate of 24 frames per second, as is the convention in the motion picture industry worldwide.

DETAILED DESCRIPTION

Figure 1:
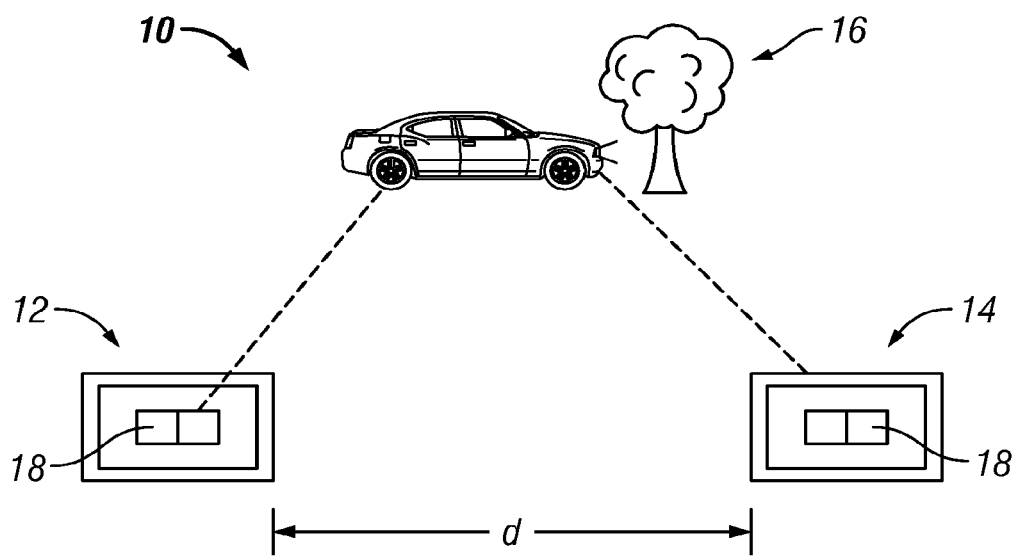
FIG. 1 illustrates an example apparatus for photographing and projecting moving images in three dimensions according to one embodiment of the present disclosure.

It is a common assumption that a movie be photographed using an industry standard of 24 fps, while subsequently projecting said images using a double-bladed projector shutter to reduce or eliminate perceived flickering. The convention has been to photograph the images using a 180-degree shutter in the camera, which has allowed the celluloid film to be advanced to the next frame during the shutter closure. In projection, each frame is shown twice via the double-bladed shutter, introducing a loss of "Temporal Continuity." This introduces a "judder" effect due to the fact that the image motion is sometimes advancing to the next frame, while sometimes frames are being shown twice. The human "persistence of vision" is utilized in the motion picture industry to allow the illusion of motion to be achieved by photographing and projecting images at a frame rate adequate to create another effect called the "flicker-fusion frequency," which enables the human visual system to see the motion as smoothly moving.

In truth, the projected sequence of images does not accurately present the same sequence as photographed, due to the double-flashing of the images. Until recently there has rarely been any motion picture technology that photographs a series of frames at the same frequency as they will be projected. This results in "Motion Discontinuity," and is generally accepted in the industry.

It is less understood by industry professionals that when such movies are projected on wider screens, the angular distance between frames is enlarged, which can become harder for human persistence of vision to merge into seemingly smooth motion.

When 24 fps is used in digital cinematography, it is customary for cinematographers to set the camera's (digital) shutter to the same conventional 180-degree opening to retain industry conventions of motion capture.

When 24 fps is used in digital projection, it is customary for the digital projector to "flash" or otherwise project each image frame five or six times, without any shutter closure in the projector. The screen remains illuminated 100% of the time, which increases illumination efficiency, while further damaging the motion continuity of the projected image. Due to human persistence of vision, the human visual system can no longer distinguish between one frame and the next, often resulting in seeing more than one frame on the human retina. For example, it is likely that the eyes will see portions of one frame, plus portions of the next frame, superimposed on the retina of the eye. Under certain camera or object motion conditions it is possible for the human eye to see three or more individual frames superimposed on the human retina, creating an objectionable and distracting "judder" in the perceived motion.

The industry standard for stereoscopic 3D motion picture photography is to use dual cameras that represent each of the human eyes, photographing the same as above using a 180-degree shutter in each camera, and the cameras are synchronized to have their shutters and exposures happen at the same moment in time. As a result, only 50% of the action is captured, due to the shutter closures, as has been the industry convention for 100 years.

The industry standard for stereoscopic 3D projection is now all-digital, and the industry has adopted a new manner of "flashing" the frames in a left-right sequence that flashes each frame three times for the left eye, and three times for the right eye, interleaved in time, for a total "flash rate" of 144 flashes per second using a single digital projector.

One of the many flaws in the above described technique is that a single digital projector will sequentially flash the left and right frames alternately, thus no longer projecting the images in the same continuity as they were photographed. This can introduce severe stereoscopic anomalies that adversely affect human perception of smooth motion and dimensionality.

Some filmmakers have been frustrated by the above problems and have determined that photographing and projecting motion pictures at a higher frame rate will reduce the objectionable motion artifacts, thus producing an improved perception of motion with reduced stereoscopic anomalies. This has resulted in films being shot at 48, 60, and 120 fps.

In projection these films may be projected using digital projectors that replicate the photographed frame rate. To date, the results of these has moved the perceived frame rate closer to, at, or exceeding the frame rates of television—which has no shutter, thus introducing a "Video Look" to the perceived image.

Further, most televisions sold today have a default setting that further exacerbates the "Soap Opera Effect" via frame interpolation that can increase the projected image rate to 120 fps or more.

Embodiments of the present disclosure provide for a high frame rate stereoscopic projection of 120 (or 144 or other) frames per second, which allows for a much wider field of view without any of the above-described objectionable artifacts. There is no blurring, strobing, or judder, since each frame is shown only once, thus offering a seamless and smooth fusion of motion. For this stereoscopic solution, the left-right frames are sequentially projected in the same sequence as they were stereoscopically photographed. This creates "Perfect Temporal Continuity" that human persistence of vision sees as without having any objectionable artifacts, while retaining the important "Film Look" associated with cinema, as opposed to the "Video Look" associated with television.

Embodiments of the present disclosure provide for the unique attributes of high-frame-rate stereoscopic projection using a single digital projector, which provides a powerful sense of immersion when shown on wide screens, and the human eye perceives each frame as unique and separate from the others by virtue of the natural left-right "shuttering" that occurs via the chosen 3D projection technology, whether it is linearly polarized, circularly polarized (ReaID), or dichroic (Dolby 3D), or actively shuttered via electronically controlled liquid crystal glasses. As used herein, the term dichroic, in addition to its plain and ordinary meaning, includes a device (such as glass) that displays two different colors by undergoing a color change in certain lighting conditions or when the light is viewed from different directions or viewing angles.

Thus, the 50% duty cycle of the illumination to each eye (in this case 60 or 72 fps), combined with the unique and patented attribute of photographing the left-right frames out of phase, the result is that 100% of the action has been captured and delivered to the screen using 100% of the illumination power in the projector. As a result, photographing a stereoscopic sequence at 60 fps per eye, for example, results in 120 fps being perceived by the viewer—still retaining the "Film Look", using a single digital projector.

Using existing standards of digital projection, in addition to providing the projector with a new frame on each flash and photographing the frames in a temporal sequence that replicates the sequence at which the frames will be projected, results in "Perfect Temporal Continuity" that has no judder, no blurring, and no objectionable motion artifacts.

A high frame rate can be achieved by photographing a series of synchronized left-right frames at 48, 60, 72, 120, or 144 frames per second, and projecting the sequence of frames at the same frame rate as photographed. This can be accomplished in 2D using a single camera, or 3D using dual cameras. Nevertheless, since the conventional digital projector(s) do not have shutter closures, the result appears "Television Like", rather than "Film Like."

Further, to project 120 or 144 fps stereoscopically, dual projectors can be used, which potentially introduces increased cost, image alignment issues, and other operational problems that can be disruptive and expensive.

Embodiments of the present disclosure provide a series of solutions to all the above issues, including digitally introducing a shutter effect under all projection circumstances to retain the "Film Look" that is lost when the digital projector illuminates the screen continuously or substantially continuously.

For example, in some embodiments, the shutter is closed for 50% of the time for both the left and right eyes viewing the film. The result is "Film Like", even though the shutter closures are out of phase.

Some other embodiments include a technique of introducing a shutter closure in the stream of images presented to the digital projector. For example, shutter closures occur for both eyes for stereoscopic projection, and it has been discovered that this shutter closure is a factor in replicating the "Film Look" that has been associated with seeing films projected onto screens for the last 100 years, since the mechanical projectors had rotating shutters with a 50% duty cycle.

Another embodiment provides a 60 fps film, photographed using a 180-degree shutter, which can be digitally projected using a digital file/frame source that includes interleaving or alternating dark, or non-image, frames with image frames, thus replicating the effect of the older mechanical shutters. This preserves perfect temporal continuity by projecting the sequence of images in the same sequence as photographed, while digitally replicating the camera shutter in the projector. The result is that the 60 fps frame rate of television is achieved, while eliminating the "Video Look" associated with 60 fps shown on televisions without any shutter.

Figure 6:
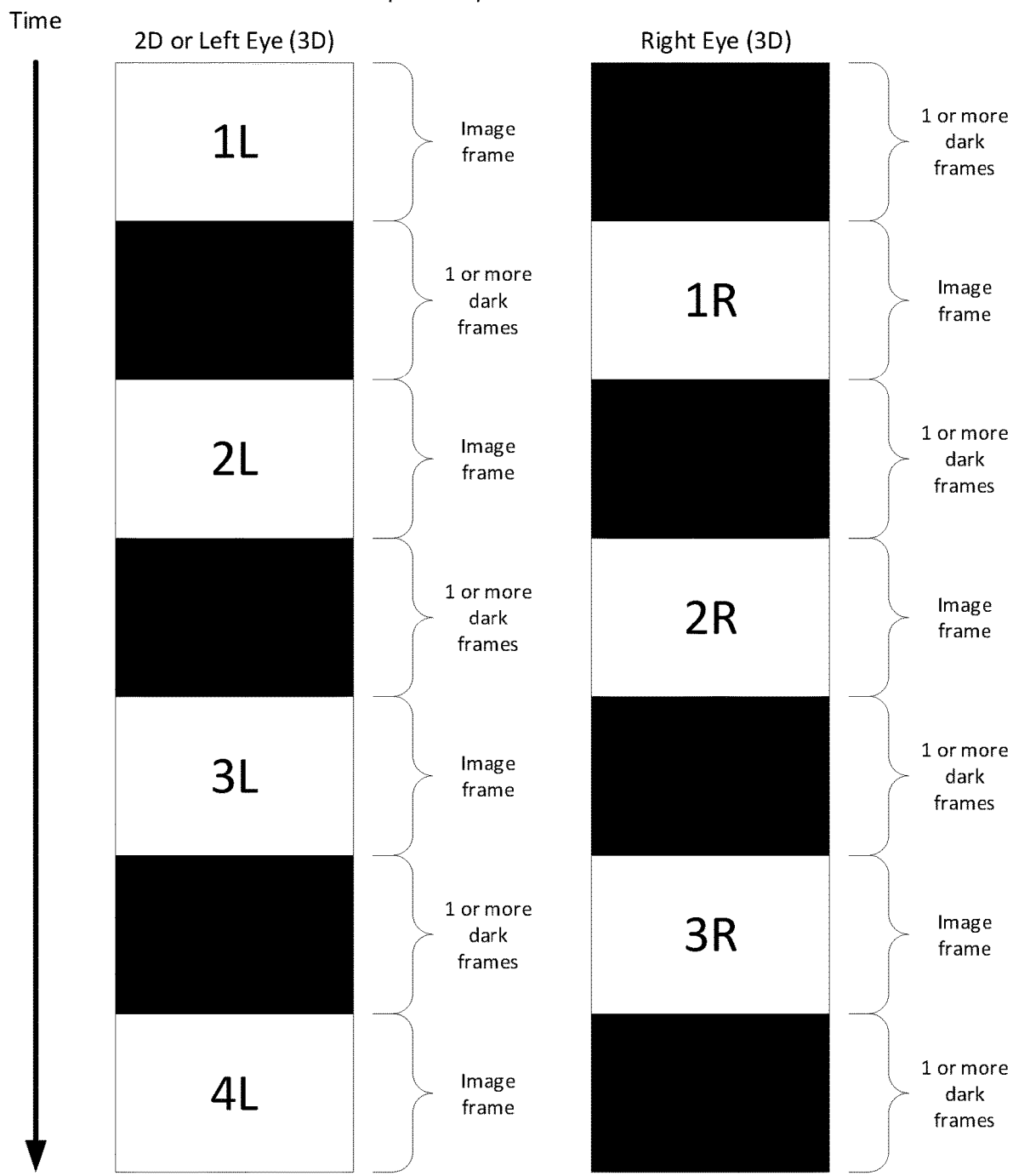
FIG. 6 shows a digital image projection technique, in accordance with an embodiment of the present disclosure.

Further, it is possible to achieve various other higher frame rates of projection, by introducing a 50% duty cycle interleaving or alternating dark frames to achieve a "Film Look" even at 120 or 144 fps, such as depicted in FIG. 6.

It is customary in the motion picture industry to photograph a "stereo-pair" of left and right images that are exposed at the same time, no matter what shutter opening is chosen. According to an embodiment of the present disclosure, stereoscopic photography can be projected with a single projector by offsetting the camera shutter openings 180-degrees out of phase in order to exactly replicate the sequence of projection.

According to an embodiment, a left-right sequence of stereoscopic frame projections is temporally offset in such a way that the sequence of photography exactly matches the sequence of projection, at any frame rate. For example, there are several dual-projector stereoscopic systems being offered to the cinema industry by IMAX®, Dolby®, and others. Such systems assume that one projector projects the left frames, while another projector projects the right frames in synchronization and without any shutter. An advantage of the disclosed techniques, however, is that each projector delivers 100% of its available luminance, and by using two projectors, the light loss associated with polarization, dichroic, or other 3D methods can be compensated for.

Embodiments the present disclosure provide for the introduction of one or more consecutive "digital dark frames" into the image streams presented to the dual projectors in such a manner that the sequence of out-of-phase photography is replicated via out-of-phase projection. This is achieved by alternately introducing the dark frames so that the sequence of stereoscopic images is presented in proper temporal continuity.

A novel attribute of stereoscopic projection at 120 or 144 fps includes the introduction of the above-mentioned "dark frames" that replicate the mechanical shutters of the past, and retain the "Film Look", even using dual projection systems. Considering this applied to a dual projection system as mentioned above, the result reduces the luminance by 50%, thus possibly obviating the advantages of dual projection/dual light source systems.

A novel attribute of the disclosed techniques is that the perfect temporal continuity as mentioned above can be attained using a single digital laser illuminated projector, which has the attribute of double the light of conventional xenon or other forms of illumination. This can be achieved using the advent of 6P (six primary color) dual laser illumination systems that use tuned frequency lasers that match the same tuned frequency filtering of dichroic glasses. Embodiments of the present disclosure include the introduction of dual frequency set 6P laser illumination, which is introduced into a single projector using a conventionally rotating shutter that synchronizes the two sets of wavelengths of the right and left image streams. The result recovers the 100% illumination needs of large screen and brightly illuminated 3D imagery, while maximizing the potentials of laser illumination that can achieve double the luminance of xenon.

In some cases, xenon or laser illumination is provided by a single digital projector (with laser illumination offering double the output of xenon) using conventional polarized systems such as IMAX, ReaID, and others.

Additional Examples

As alluded to above, embodiments of the present disclosure intend to correct object/image motion and blurring at the digital camera, by photographing a sequence of left eye and right eye images at the heretofore unheard of rate of 144 fps, thus delivering to viewers an accurate depiction of the actual motion that occurred at that moment. In digital projection, each frame is shown in its correct temporal sequence, while alternating between left eye and right eye flashes, thus resulting in each eye receiving 72 flashes per second, for a total of 144 fps. Existing digital projection systems already include 120 and 144 cycles-per-second flash rates, thus showing each of the 24 frames five or six times for 2D imagery, or two or three times for interleaved 3D alternating polarization. This eliminates flicker and makes possible substantially increased screen brightness, since the limiting factor of 16 foot lamberts at 48 flashes per second has been substantially exceeded.

In the short-term implementation of various embodiments, photography will occur at a predetermined frame rate that is considered more than adequate to capture clear and unblurred stereoscopic image information, preferably at around 120 or 144 frames per second. Alternatively, however, this could possibly be any new number of frames per second necessary to meet industry demands regarding data storage, compression, and distribution costs vs. image quality/impact issues.

An example of the above process would be to shoot at 144 frames per second with a shutter opening of 360 degrees, which is possible with certain digital cameras. In this way, each frame would have an exposure of almost exactly $1/144$th of a second, resulting in minimal blur on each frame as compared to shooting at 24 fps, with a shutter opening of $1/48$th of a second. By digitally alternating left and right eye frames in correct temporal succession, the resultant imagery would create a strong immersive experience.

Figure 2:
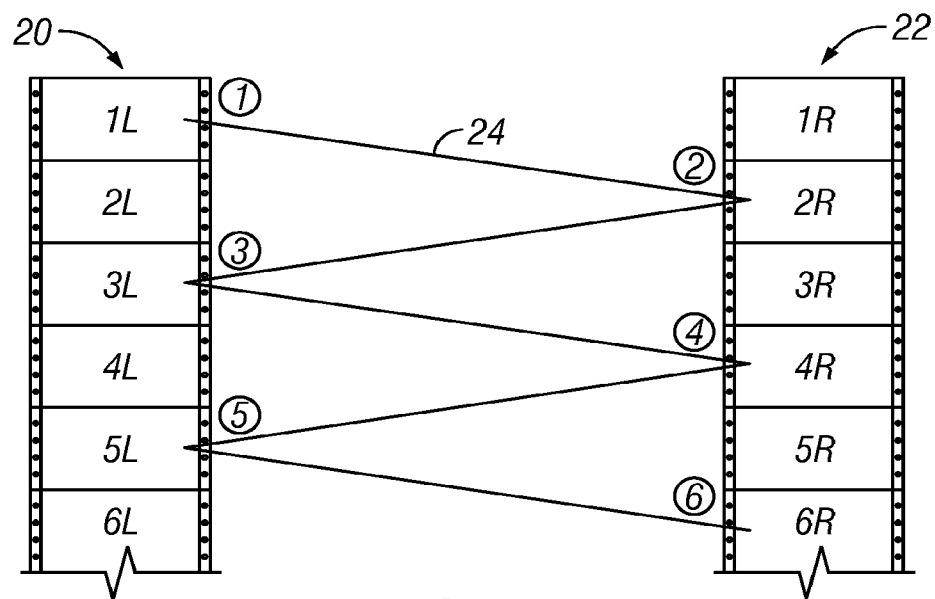
FIG. 2 illustrates example frames of images recorded on a pair of sprocketed film reels using the apparatus of FIG. 1, in accordance with an embodiment of the present disclosure.

Referring to FIG. 1, a first embodiment of the present disclosure is shown. As illustrated therein, a first iteration of the process would be to configure dual digital cameras, a first camera 12 and a second camera 14, side-by-side, with a lens center separation, d, similar to standard interocular spacing of approximately 2.25". Each camera would record synchronized imagery 16 at 144 frames per second, using a 360 degree shutter 18. This recorded synchronized imagery is shown in FIG. 2 wherein imagery from the first camera 12 is recorded on a first strip of film 20 and imagery from the second camera 14 is recorded on a second strip of film 22. Thus, by alternately interleaving frames 1,3,5,7,9 from the first camera 12 (deleting the even frames) with frames 2,4,6,8 etc. (deleting the odd frames) from the second camera 14, a single data stream would therefore contain alternating stereo pairs of images that would be projected in correct temporal sequence, resulting in extremely fluid, non-blurred, and higher impact stereoscopic imagery that could then be projected via an alternating polarization system such as ReaID's single projector electronically controlled polarization. The image sequence of interleaved frames, i.e., the data stream, is represented by the zigzag sequence line 24 in FIG. 2.

Figure 3:
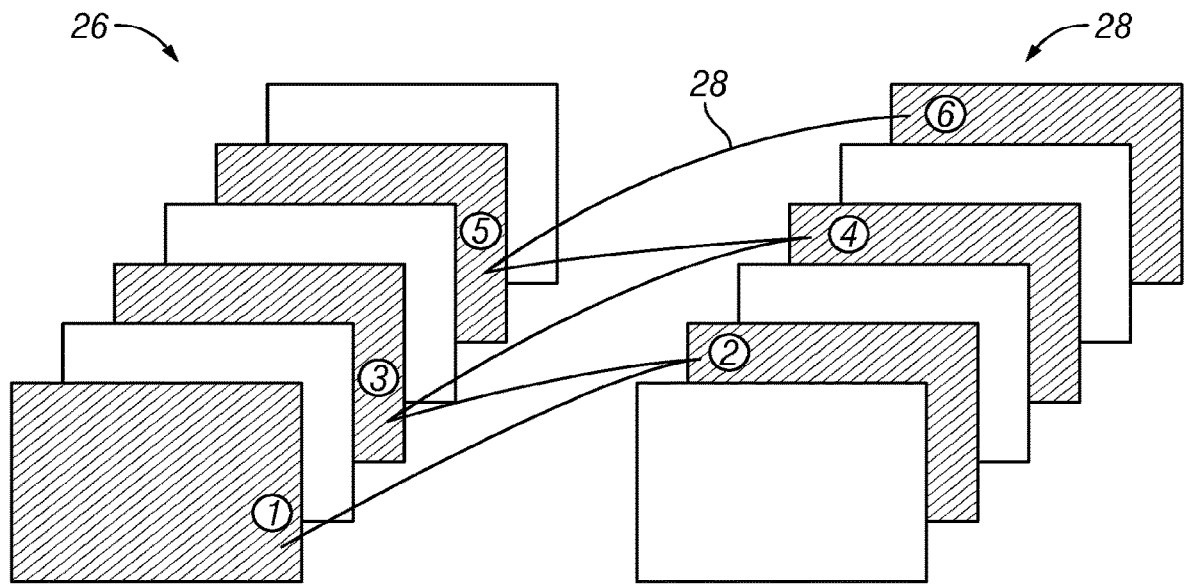
FIG. 3 illustrates example frames of images recorded digitally using the apparatus of FIG. 1, in accordance with an embodiment of the present disclosure.

Referring to FIG. 3, frames of images recorded digitally using the apparatus 10 of FIG. 1 are shown wherein the first set of frames 26 contain imagery recorded by the first camera 12 and the second set of frames 28 contain imagery recorded by the second camera 14. As discussed above, by alternately interleaving frames 1,3,5,7,9 from the first camera 12 (deleting the even frames) with frames 2,4,6,8 etc. (deleting the odd frames) from the second camera 14, a single data stream would therefore contain alternating stereo pairs of images that would be projected in correct temporal sequence, resulting in extremely fluid, non-blurred, and higher impact stereoscopic imagery. The image sequence of interleaved frames, i.e., the data stream, is represented by the zigzag sequence line 30 in FIG. 2.

Figure 4:
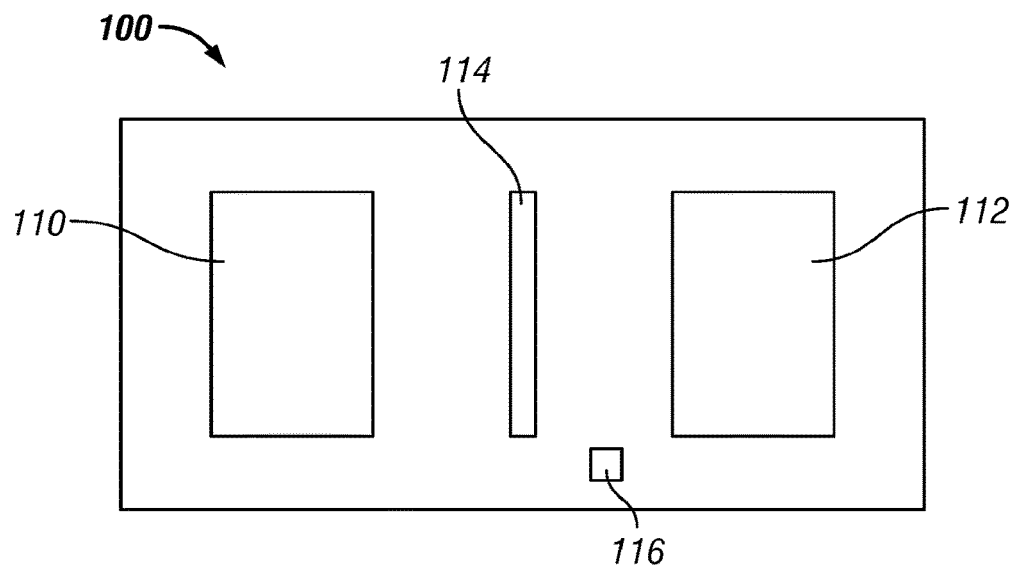
FIG. 4 illustrates an example apparatus for photographing and projecting moving images in three dimensions in accordance with another embodiment of the present disclosure.

Referring now to FIG. 4, an apparatus 100 according to a second embodiment of the present disclosure is shown. As shown therein, a second embodiment of the present disclosure includes the fabrication of a single digital camera technology that includes within it the appropriate left and right eye lenses 110, 112 and an alternating rotating mirror shutter 114 that would sequentially deliver left and right eye images to a single sensor 116 at 144 fps. Thus, the left and right eyes each receive interleaved stereoscopic streams of 72 fps each.

The most common digital projection systems today are using either the Texas Instruments Digital Light Processing chips (DLP) that use a matrix of micro mirrors to deliver imagery or the Sony SXRD liquid crystal on silicon (LCOS) technology. Such chips can switch states of the micro mirrors at up to 144 Hz. They use a frame buffer that retains 24 frame material, so each frame may be flashed six times for 2D, or in the event of 3D, alternates between left and right imagery, showing each frame for three alternating flashes. Embodiments of this disclosure anticipate the introduction of a new contiguous data stream, without a frame buffer, that can introduce new motion imagery on virtually every flash, thus resulting in extremely sharp and unblurred stereoscopic motion.

An additional anticipated aspect of this new technology involves issues related to potentially reduced signal to noise ratio, lowered bit depth, or other problems resulting from such brief exposures on a CCD or CMOS imager. However, trading off these issues with increased apparent sharpness and clarity (rather than blur) could more than make up for this. It is also possible to trade off resolution in exchange for motion continuity and clarity, for example reducing resolution from, say, 4K to 2K, while delivering less blurred stereoscopic imagery. The human eye may still prefer, and not notice, such a process since the overall experience is one of tremendously increased image information.

The expected result of various embodiments will be the advent of a digital motion picture standard that contains within it the desires of both filmmakers and cinema viewers to deliver the immersive experience that they expect of a 3D movie, but with all of the objectionable artifacts of blurring, strobing, limited screen brightness, and loss of stereoscopy for 3D removed and corrected. Various embodiments will facilitate the production of films with unlimited action potential, as well as unlimited screen size and brightness. Various embodiments anticipate the inclusion of motion/action that may exceed the 60 frames per second rate of Showscan, with fast action updated on every flash, rather than the objectionable double shuttering of film. Overall, various embodiments will result in an increased sense of audience excitement and stimulation, which is expected to be measurable via electromyogram, electroencephalogram, galvanic skin response, electrocardiogram, and possibly even Functional Magnetic Resonance Imaging.

Since 3D films must also be available to the marketplace in normal 2D as well as 24 fps standard for showing in normal cinemas and on television, it is an implicit intention of various embodiments to offer that (from either left or right eye image streams) groups of frames can be digitally merged into a single frame that would be indistinguishable from the same subject photographed at 24 fps, since the shutter was open 360 degrees. This is accomplished, in the case of 144 fps by combining three sequential frames into one, then deleting the next three sequential frames, thus resulting in 24 frames that would be identical to having been originally photographed with a 180 degree shutter. In the case of 120 fps, three sequential frames would be combined, and the following two sequential frames would be deleted, thus also resulting in 24 fps. If a filmmaker chose to use the iteration of various embodiments that use a single digital camera equipped with an alternating mirror shutter there could be objectionably uneven merging of frames, since there would no longer be the equivalent of a 360 degree shutter, but rather a 180 degree shutter. Nevertheless, it would be possible to use the 120 frame version of various embodiments, using only the (single eye) sequence of combining frames 1 and 3, while deleting frame 5, thus resulting again in 24 fps.

Stereoscopic imagery is typically made up of a stereo pair of images photographed simultaneously using 180 degree shutters running at, for example, 24 frames per second. In this manner, each frame of both cameras is simultaneously exposed for ⅟₄₈th of a second, which means that 50% of the action in the scene is lost forever between exposures because of the shutter closures. Some existing 3D projectors project alternating left and right frames three times for a total of 144 flashes per second. The triple flashes contain no motion because they are repeats of the same frame. Some other stereoscopy imagery is also made up of a stereo pair of images photographed simultaneously, however using 270 degree shutters running at 48 frames per second. In this manner, a portion of the action is still lost because the shutters were closed for 90 degrees. During projection, every left and right frame is shown two times for a total of 192 flashes per second. Yet another technique shoots the scene at 60 frames per second with a 180 degree shutter, and projects each left and right frame once for a total of 120 flashes per second. However, since the left and right frames are simultaneously recorded, again there is not perfect temporal continuity in the sequence.

In accordance with an embodiment, techniques are disclosed for presenting alternating left and right eye images using a temporal offset between images, such that a set of 60 frame per second images to each eye contain a total of 120 unique positions in time. By contrast with existing techniques, various embodiments of the present disclosure introduce a temporal cadence, so that left and right images contain different positions in time rather than simultaneous exposures of the scene, as with existing techniques. This new temporal cadence creates a unique illusion of realism when displayed at 120 frames per second.

In accordance with various embodiments, it is appreciated that perfect temporal continuity of alternating left and right eye images for stereoscopic display eliminates perceived motion artifacts that result from conventional methodology of photographing stereo pairs of images that are photographed simultaneously, but displayed consecutively. Existing Virtual Reality systems are designed based upon the assumption that a stereo pair of images are recorded or generated by a graphics engine simultaneously. Existing Virtual Reality systems may use various frame rates to smooth out motion artifacts. By contrast, embodiments of the present disclosure provide techniques for generating and delivering each of the left and right images of a stereo pair in an alternating sequence in time, which results in a superior sense of realism to the observer and improved realism resulting from an apparent doubling of the effective frame rate.

To this end, in accordance with an embodiment, a motion picture photographic and projection system is configured to photograph each left and right eye image of a stereoscopic pair in an alternating temporal sequence, with the 180 degree shutters of the left and right cameras being out of synchronization. For example, when the left camera shutter is open, the right camera shutter is closed, and vice versa, so that at any given instant in time either the left or the right shutter is open, matching the cadence of the projector, thus allowing a continuous temporal sequence of action to be recorded. This alternating temporal sequence can be the same temporal sequence at which the images can subsequently be displayed. For example, each alternating left and right image may be photographed at 60 images per second, resulting in a total of 120 motion images each photographed at different points in time. Alternately, both cameras with 360 degree shutters can be recording in synchronization, but alternate (odd and even) frames in the left and right sequence are discarded and not projected, while the other frames are flashed in a left-right sequence. These techniques, according to various embodiments, result in an unexpected illusion of reality, which is an important attribute for Virtual Reality systems. Furthermore, embodiments of the present disclosure provide the advantage of smoother motion, less blurring, and the ability to include much faster action, while reducing bandwidth of the image generation/display computer, in comparison to existing techniques. Embodiments of this disclosure may be readily included in a wide variety of Virtual Reality display systems, improving their performance and realism at lower cost.

Figure 5:
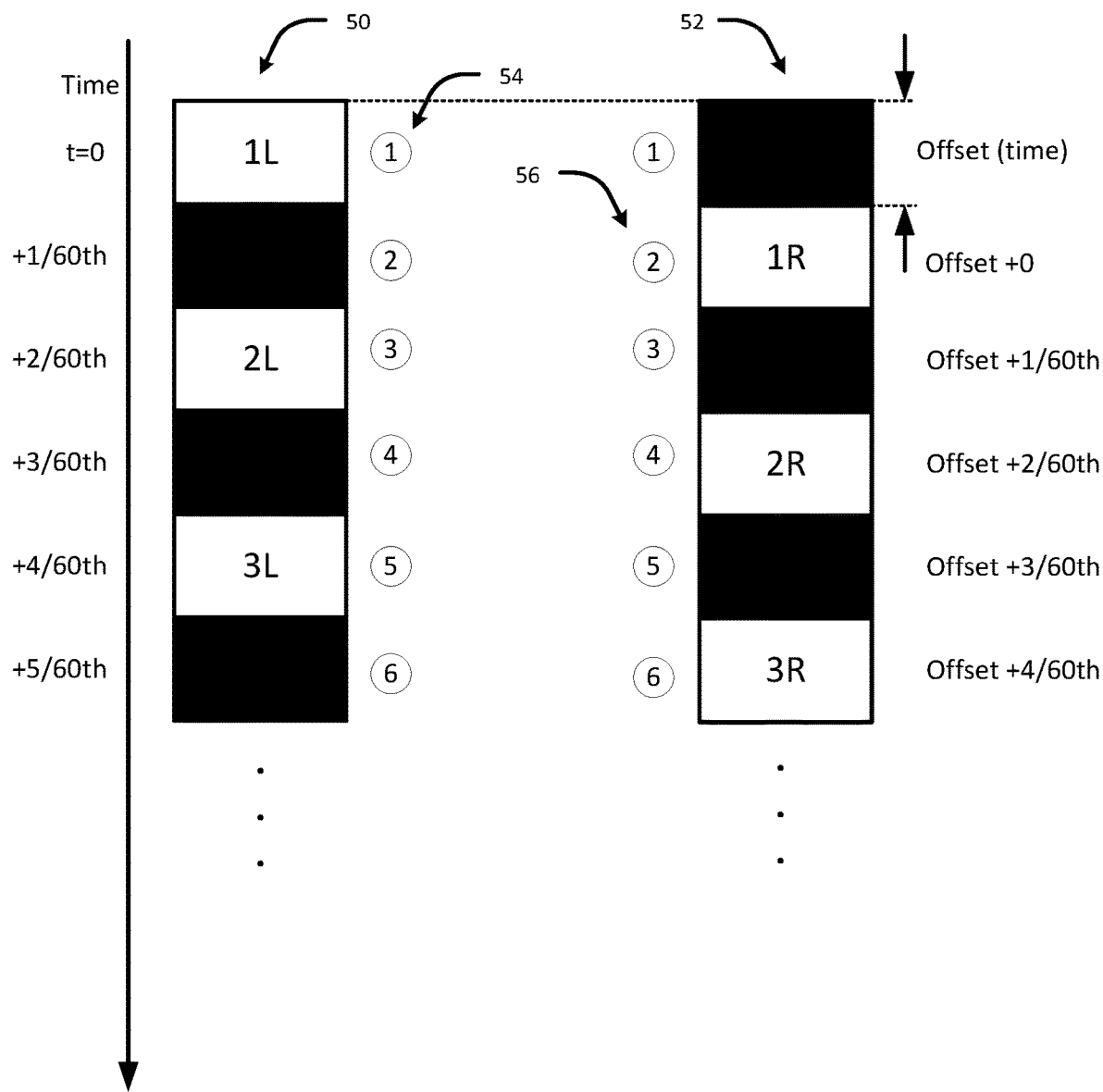
FIG. 5 illustrates example frames of images recorded on a pair of film strips using the apparatus of FIG. 1, in accordance with an embodiment of the present disclosure.

Referring again to FIG. 1, and according to another embodiment of the present disclosure, the dual digital cameras including the first camera 12 and the second camera 14 can be configured side-by-side, with a lens center separation, d, similar to standard interocular spacing of approximately 2.25". In this embodiment, each camera 12, 14 is configured to record non-synchronized imagery 16 at, for example, 60 frames per second, using a 180 degree shutter 18. In particular, each camera 12 and 14 is configured to record the imagery 16 using a temporal offset, such as shown in FIG. 5, where the second camera 14 records a frame (e.g., 1R) at some non-zero time after the first camera 14 records a frame (e.g., 1L). The frames (e.g., 1L and 1R) are recorded at different points in time, as indicated by the time offset. For instance, with a 180 degree shutter, the left camera shutter may be open while the right camera shutter is closed, and vice versa, so that at any given point in time one of the shutters is open. The offset may, for example, be 1/60th of a second for a 60 frame-per-second recording speed (or 180 degrees of shutter cadence), although it will be understood that other recording speeds and offsets may be used. This recorded imagery is shown in FIG. 5, where imagery from the first camera 12 is recorded on a first strip of film 50 and imagery from the second camera 14 is recorded on a second strip of film 52. In this manner, each eye is off for half of the time and on for half of the time. Thus, by alternately recording frames 1L, 2L, 3L, and so on from the first camera 12 with frames 1R, 2R, 3R, and so on, from the second camera 14, each temporally offset from the corresponding frames recorded by the first camera 12, a data stream may therefore contain stereo pairs of images that can be projected in a correct temporal cadence (e.g., left-right-left-right, etc., each left image in strip 50 projected at 60 frames per second and each right image in strip 52 projected at 60 frames per second temporally offset from the left strip 50), resulting in extremely fluid, non-blurred, and higher impact stereoscopic imagery. Such imagery may be projected via an alternating polarization system such as RealD's single projector electronically controlled polarization, a liquid crystal display, a light emitting diode (LED), an organic LED (OLED), a laser scanner, or any other left/right Virtual Reality projection system. The recorded sequence of temporally offset frames, i.e., the data stream, is represented by the sequence 54 and 56 in FIG. 5. This recorded sequence can subsequently be projected at the same speed as it was recorded (e.g., 60 or 72 frames per second) and using the same time offset as it was recorded (e.g., 1/60th of a second or other suitable interval), such that each of the projected left and right frames contain images of the scene 16 at different points in time (e.g., from time t=0, 0 seconds (left), +1/60th of a second (right), +2/60th (left), 3/60th (right), etc.).

In some embodiments, the first and second cameras 12, 14 may be the same camera having dual sensors and lenses. In some embodiments, the cameras 12, 14 may include a rotating or liquid crystal shutter. In some embodiments, instead of a camera, the system may include a graphics generation device for artificially generating images rather than recording images of a scene. The graphics generation device can be configured to generate and project alternating left/right image frames in the manner described above (e.g., the device may render the left image, then the right image, then the left image, and so forth in sequence, projecting one image at a time to the observer, alternating between the left and right eyes). In this manner, the workload of the graphics generation device may be reduced, since only one frame is being rendered at any given point in time.

One example embodiment of the present disclosure includes a method for projecting moving images in three dimensions. The method includes receiving left eye frames of a moving image as recorded with a first camera lens having a first lens center and having been recorded at at least 60 frames per second and at left eye recordal times; receiving right eye frames of said moving image recorded with a second camera lens having a second lens center that is spaced apart from the first lens center and having been recorded at at least 60 frames per second and at right eye recordal times offset from the left eye recordal times; and projecting said moving image from a single projector in three dimensions by projecting the left eye frames one time each and the right eye frames one time each, the projecting of the left eye frames and the right eye frames occurring in an alternating sequence that projects the left eye frames as recorded at the left eye recordal time by said first camera lens and the right eye frames as recorded at the right eye recordal times by said second camera lens, each successive frame of the alternating sequence having been recorded at a successive time and projected temporally with respect to one another in the same time sequence to show the moving image. In some cases, said first and said second camera lenses have a lens separation of approximately 2.25 inches. In some cases, the projecting occurs at a frame rate of 120 or more frames per second. In some cases, each successive frame of the sequence represents new motion of imagery. In some cases, the projecting said moving image includes digital projection of digital frames. In some cases, the projecting said moving image includes projecting said moving image onto a cinema screen from a single projector in three dimensions by flashing frames one time each in a sequence that alternates between left eye frames consisting of imagery recorded at the corresponding left eye recordal times by said first camera lens and right eye frames consisting of imagery recorded at the corresponding right eye recordal times by said second camera lens.

Although various embodiments have been shown and described with respect to the detailed embodiments thereof, it will be understood by those of skill in the art that various changes may be made and equivalents may be substituted for elements thereof without departing from the scope of the disclosure. In addition, modifications may be made to adapt a particular situation or material to the teachings of the disclosure without departing from the essential scope thereof. Therefore, it is intended that embodiments of the present disclosure not be limited to the particular embodiments disclosed in the above detailed description, but that the various embodiments will include all embodiments falling within the scope of this disclosure.

The invention claimed is:

1. A method of projecting moving images, the method comprising:

receiving an image stream comprising a sequence of simultaneously stereoscopically photographed digital left eye image frames and digital right eye image frames, the sequence of simultaneously stereoscopically photographed digital left eye image frames and digital right eye image frames being photographed at a frame rate;

introducing one or more consecutive digital dark frames into the image stream between each of the digital left eye image frames and between each of the digital right eye image frames, wherein each of the digital left eye image frames is temporally offset from each of the digital right eye image frames in an alternating temporal sequence interleaved with the one or more consecutive dark frames;

consecutively projecting, using a digital image projector, the sequence of simultaneously stereoscopically photographed digital left eye image frames digital right eye image frames and the one or more consecutive digital dark frames, the sequence of simultaneously stereoscopically photographed digital left eye image frames and digital right eye image frames being projected at one-half of the frame rate and the one or more consecutive digital dark frames being projected at the one-half of the frame rate to preserve temporal continuity of the digital left eye image frames and the digital right eye image frames.

2. The method of claim 1, comprising projecting the one or more consecutive digital dark frames at 48, 60, 72, 96, 120, or 144 frames per second (fps) image stream in two-dimensional (2D) or three-dimensional (3D) movies.

3. The method of claim 1, comprising projecting the one or more consecutive digital dark frames using a dual projection laser system.

4. The method of claim 1, comprising introducing the one or more consecutive digital dark frames into dual image streams for dual projector three-dimensional (3D) systems in such a manner as to replicate the temporal continuity at which the frames were photographed.

5. The method of claim 1, comprising including a mechanical or electronic shuttering mechanism within a single digital projector to enable 6P dual laser sets to achieve dichroic three-dimensional (3D), while retaining a 50% duty cycle of each of two eyes.

* * * * *